(12) United States Patent
Ishidate

(10) Patent No.: US 11,827,036 B2
(45) Date of Patent: Nov. 28, 2023

(54) OPTICAL PRINT HEAD AND METHOD FOR MANUFACTURING OPTICAL PRINT HEAD

(71) Applicant: CANON KABUSHIKI KAISHA, Tokyo (JP)

(72) Inventor: Takehiro Ishidate, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/492,150

(22) Filed: Oct. 1, 2021

(65) Prior Publication Data

US 2022/0143988 A1 May 12, 2022

(30) Foreign Application Priority Data

Nov. 6, 2020 (JP) ................. 2020-186045

(51) Int. Cl.
| | | |
|---|---|---|
| *B41J 2/45* | (2006.01) | |
| *B41J 2/47* | (2006.01) | |
| *G03G 15/04* | (2006.01) | |
| *G06K 15/12* | (2006.01) | |

(52) U.S. Cl.
CPC ............... *B41J 2/45* (2013.01); *B41J 2/451* (2013.01); *B41J 2/47* (2013.01); *G03G 15/04054* (2013.01); *G06K 15/1247* (2013.01)

(58) Field of Classification Search
CPC ..... B41J 2/45; B41J 2/451; B41J 2/47; G03G 15/04054
See application file for complete search history.

(56) References Cited

U.S. PATENT DOCUMENTS

2015/0277269 A1* 10/2015 Suzuki ................ F21V 21/00
362/382
2016/0363885 A1* 12/2016 Lee ................ G03G 15/04054

FOREIGN PATENT DOCUMENTS

| JP | 2008-251668 A | 10/2008 |
|---|---|---|
| JP | 4530230 B2 | 8/2010 |
| JP | 2010208125 A * | 9/2010 |
| JP | 2015073221 A * | 4/2015 |

* cited by examiner

*Primary Examiner* — Justin Seo
*Assistant Examiner* — Kendrick X Liu
(74) *Attorney, Agent, or Firm* — VENABLE LLP

(57) ABSTRACT

There is provided an optical print head including: a substrate on which a plurality of light emitting elements is mounted on one surface, and a plurality of electronic components including a driver IC that drives the plurality of light emitting elements is mounted on the other surface opposite to the one surface; and a lens array including a plurality of lenses that respectively condenses light emitted from the plurality of light emitting elements to a photosensitive drum. The substrate includes a plurality of connecting pieces obtained by cutting a connecting portion with another substrate in a longitudinal direction of the substrate, and at least one of the connecting pieces is provided at a position corresponding to a region of the substrate where the driver IC is to be mounted in the longitudinal direction of the substrate.

5 Claims, 19 Drawing Sheets

OPTICAL PRINT HEAD AND METHOD FOR MANUFACTURING OPTICAL PRINT HEAD

BACKGROUND OF THE INVENTION

Field of the Invention

The present invention relates to an optical print head that condenses light emitted from a plurality of light emitting elements through a plurality of lenses, and a method for manufacturing the optical print head.

Description of the Related Art

In the related art, when an optical print head including a substrate on which light emitting elements are mounted is manufactured, a wire bonding method is used in which the substrate and the light emitting elements mounted on the substrate are connected by a wire.

Japanese Patent No. 4530230 discloses a wire bonding method in which a pad formed on a substrate and an element pad formed on a surface of a light emitting element mounted on the substrate are connected by a wire protruding from a tip of a capillary.

At the time of manufacturing an optical print head, from the viewpoint of mass production efficiency, a state in which a plurality of substrates is connected by a connecting portion is set as an initial shape, and the above wire bonding is performed on the plurality of connected substrates.

In the substrate, light emitting elements are mounted on a front surface of the substrate, and an electronic component such as a driver IC that drives the light emitting elements is mounted on a back surface of the substrate. However, when an electronic component is mounted on the back surface of the substrate after wire bonding of the light emitting elements is performed on the front surface of the substrate, a flux component and the like contained in the solder volatilizes during mounting of the electronic component, and the surface of the light emitting elements on the front surface of the substrate may be fogged.

Therefore, in manufacturing the optical print head, it is desirable to first mount the electronic component on the back surface of the substrate and then perform wire bonding of the light emitting elements on the front surface of the substrate.

However, when wire bonding is performed on the front surface of the substrate on which the electronic component is mounted on the back surface, a pressing force of about 100 gf is applied to the substrate from the capillary. Therefore, only the rigidity of the substrate itself cannot withstand the pressing force of the capillary, and the substrate is bent by receiving the pressing force from the capillary.

Therefore, it is conceivable to support the back surface of the substrate with a jig when wire bonding is performed on the front surface of the substrate in a manner that the substrate does not bend even when receiving the pressing force of the capillary.

However, it is necessary to avoid supporting the region of the back surface of the substrate where the driver IC is mounted with a jig. Furthermore, in a case where the mounting region of the driver IC is close to the end of the back surface of the substrate in the lateral direction orthogonal to the longitudinal direction of the substrate, it is difficult to support the driver IC mounting region of the back surface of the substrate with a jig when the wire bonding is performed.

SUMMARY OF THE INVENTION

An optical print head according to an exemplary embodiment of the present embodiment includes: a substrate on which a plurality of light emitting elements is mounted on one surface, and a plurality of electronic components including a driver IC that drives the plurality of light emitting elements is mounted on the other surface opposite to the one surface; and a lens array including a plurality of lenses that respectively condenses light emitted from the plurality of light emitting elements. The substrate includes a plurality of connecting pieces obtained by cutting a connecting portion with another substrate in a longitudinal direction of the substrate, and at least one of the connecting pieces is provided at a position corresponding to a region of the substrate where the driver IC is to be mounted in the longitudinal direction of the substrate.

In addition, a method for manufacturing an optical print head according to an exemplary embodiment of the present embodiment includes a substrate on which a plurality of light emitting elements is mounted on one surface, and a plurality of electronic components including a driver IC that drives the plurality of light emitting elements is mounted on the other surface opposite to the one surface, and a lens array including a plurality of lenses that respectively condenses light emitted from the plurality of light emitting elements. The substrate is an assembly in which a plurality of substrates is connected by a plurality of connecting portions, and obtained from the assembly through mounting the driver IC on the other surface of each substrate in the assembly, mounting the plurality of light emitting elements on the one surface of each substrate in the assembly, applying wire bonding to the plurality of light emitting elements of each substrate in a state in which both sides in a lateral direction of a surface of each substrate in the assembly on which the driver IC is mounted is supported by a jig along a longitudinal direction, and cutting the plurality of connecting portions, the substrate includes a plurality of connecting pieces obtained by cutting a connecting portion with another substrate in a longitudinal direction of the substrate, and at least one of the connecting pieces is provided at a position corresponding to a region of the substrate where the driver IC is to be mounted in the longitudinal direction of the substrate.

Further features of the present invention will become apparent from the following description of exemplary embodiments with reference to the attached drawings.

DESCRIPTION OF THE EMBODIMENTS

Hereinafter, exemplary embodiments of the present invention will be exemplarily described with reference to the drawings. However, the components described in the following description are merely examples, and the scope of the present invention is not limited to them.

(Image Forming Apparatus)

Figure 2:
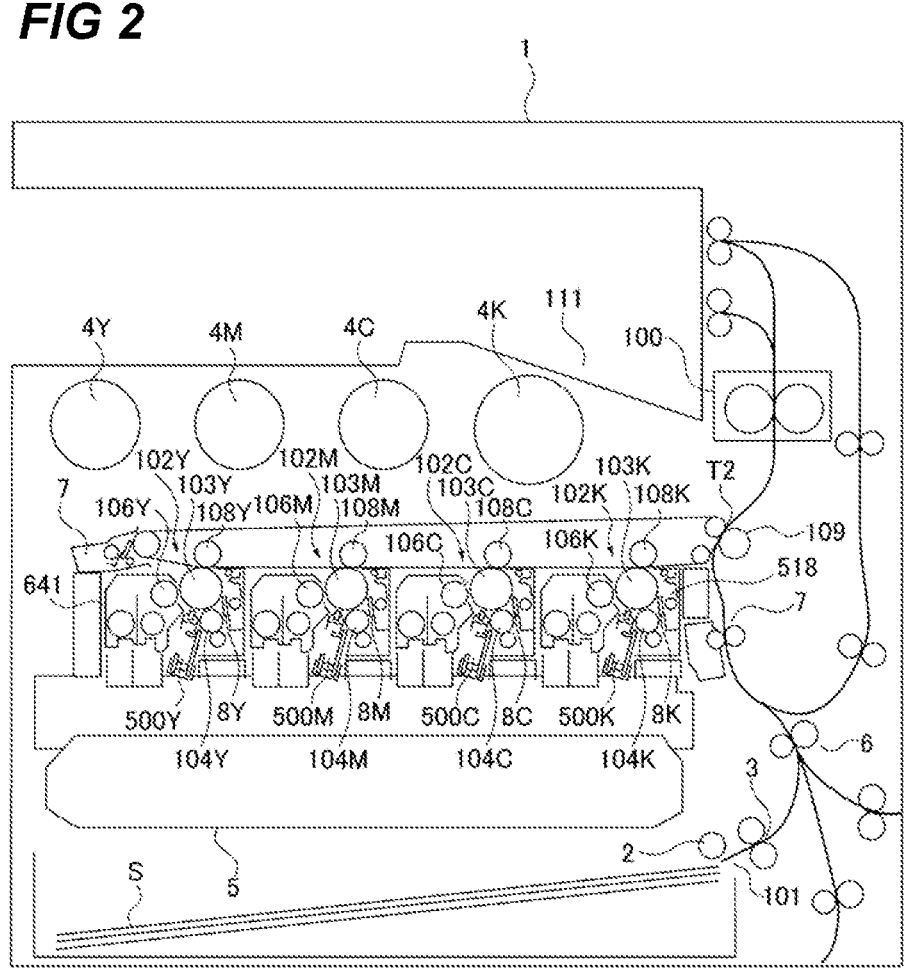
FIG. 2 is a cross-sectional view illustrating a schematic configuration of an image forming apparatus.

First, a schematic configuration of an image forming apparatus 1 will be described with reference to FIG. 2. FIG. 2 is a schematic cross-sectional view of the image forming apparatus 1. Although the image forming apparatus 1 illustrated in FIG. 2 is a color printer (multi function printer (MFP)) including a reading device, the embodiment may be a printer not including a reading device. In addition, the embodiment is not limited to a so-called tandem type color image forming apparatus including a plurality of photosensitive drums 103 as illustrated in FIG. 2, and may be a color image forming apparatus including one photosensitive drum 103 or an image forming apparatus that forms monochrome images.

The image forming apparatus 1 illustrated in FIG. 2 includes four image forming portions 102Y, 102M, 102C, and 102K (hereinafter, also collectively and simply referred to as "image forming portions 102") that form toner images of respective colors of yellow, magenta, cyan, and black. The image forming portions 102Y, 102M, 102C, and 102K respectively include photosensitive drums 103Y, 103M, 103C, and 103K (hereinafter, also collectively and simply referred to as "photosensitive drums 103"). These photosensitive drums 103 are arranged apart from each other. In addition, the image forming portions 102Y, 102M, 102C, and 102K include chargers 104Y, 104M, 104C, and 104K (hereinafter, also collectively and simply referred to as "chargers 104") that respectively charge the photosensitive drums 103Y 103M, 103C, and 103K. In addition, the image forming portions 102Y, 102M, 102C, and 102K include light emitting diode (hereinafter referred to as LED) exposure units 500Y, 500M, 500C, and 500K (hereinafter, also collectively and simply referred to as "exposure units 500") as exposure light sources that emit light for exposing the photosensitive drums 103Y, 103M, 103C, and 103K. Further, the image forming portions 102Y 102M, 102C, and 102K include development devices 106Y, 106M, 106C, and 106K (hereinafter, also collectively and simply referred to as "development devices 106") that develop electrostatic latent images on the photosensitive drums 103 with toner and develop a toner image of each color on the photosensitive drums 103. Note that Y, M, C, and K attached to the reference numerals indicate the colors of the toner.

The image forming apparatus 1 illustrated in FIG. 2 is an image forming apparatus that adopts a so-called "lower surface exposure system" that exposes the photosensitive drums 103 from below. Hereinafter, a description will be given on the premise of an image forming apparatus adopting a lower surface exposure system, but an image forming apparatus adopting an "upper surface exposure system" that exposes the photosensitive drums from above may be used as an embodiment.

The image forming apparatus 1 includes an intermediate transfer belt 107 to which toner images formed on the photosensitive drums 103 are transferred, and primary transfer rollers 108 (Y, M, C, K) that sequentially transfer the toner images formed on the photosensitive drums 103 to the intermediate transfer belt 107. In addition, the image forming apparatus 1 includes a secondary transfer roller 109 that transfers the toner image on the intermediate transfer belt 107 to a recording material S conveyed from a sheet feeder 101, and a fixing device 100 that fixes the secondarily transferred image to the recording material S.

Toner remains on the surfaces of the photosensitive drums 103Y, 103M, 103C, and 103K after the primary transfer. These residual toners are removed by drum cleaning devices (first cleaning devices) 8Y, 8M, 8C, and 8K (hereinafter, also collectively and simply referred to as "drum cleaning devices 8"), and are collected in a collected toner container 5.

In addition, the toner remains on the surface of the intermediate transfer belt 107 after the secondary transfer. The residual toner is removed by belt cleaning devices (second cleaning devices) 7 and collected in the collected toner container 5.

(Image Forming Process)

Next, the image forming process of the image forming apparatus will be briefly described. The charger 104Y charges the surface of the photosensitive drum 103Y. The exposure unit 500Y exposes the surface of the photosensitive drum 103Y charged by the charger 104Y As a result, an electrostatic latent image is formed on the photosensitive drum 103Y. Next, the development device 106Y develops the electrostatic latent image formed on the photosensitive drum 103Y with yellow toner. The yellow toner image developed on the surface of the photosensitive drum 103Y is transferred onto the intermediate transfer belt 107 by the primary transfer roller 108Y. Magenta, cyan, and black toner images are also formed by a similar image forming process and transferred to be superimposed on the intermediate transfer belt 107.

The toner image of each color transferred onto the intermediate transfer belt 107 is conveyed to a secondary transfer portion T2 by the intermediate transfer belt 107. A transfer bias for transferring the toner image to the recording material S is applied to the secondary transfer roller 109 disposed in the secondary transfer portion T2. The toner image conveyed to the secondary transfer portion T2 is transferred to the recording material S conveyed from the sheet feeder (sheet feeding cassette) 101 by the transfer bias of the secondary transfer roller 109.

The recording material S is stored in a form of being stacked in the sheet feeder 101, and is fed to the conveyance path 20 according to the image forming timing. In the sheet feeding method, first, the tip of the recording material S is flipped up by friction of a sheet feeding roller 2, and only one sheet of the recording material S is conveyed to the conveyance path 20 by a pair of sheet separation conveying rollers 3 for suppressing double feeding of the recording material S. After that, the recording material S pulled out by a pair of conveying rollers 6 is conveyed to a pair of registration rollers 7 through the conveyance path 20 and temporarily stopped. Note that the recording material S is conveyed to the secondary transfer portion T2 after skew feeding correction and timing correction are performed by the pair of registration rollers 7.

The recording material S to which the toner image has been transferred by the secondary transfer portion T2 is conveyed to the fixing device 100. The fixing device 100 fixes the toner image on the recording material S by heat and pressure. The recording material S subjected to the fixing processing by the fixing device 100 is discharged to the sheet discharge portion 111.

As illustrated in FIG. 2, the image forming apparatus 1 includes toner containers 4Y, 4M, 4C, and 4K (hereinafter, also collectively and simply referred to as "toner containers 4"). By performing the image forming, the toner amount in a development unit 641 (described later) decreases. At that time, the toner is supplied from the toner containers 4Y, 4M, 4C, and 4K provided corresponding to the image forming portions 102Y, 102M, 102C, and 102K to the development unit 641 (described later) via pipes (not illustrated). That is, in the development unit 641 (described later) included in the image forming apparatus 1 described in the present embodiment, while new toner is supplied from the toner containers 4, a part of the excessive toner is conveyed to the collected toner container 5 as residual toner.

(Drum Unit and Development Unit)

A replaceable drum unit in the image forming apparatus of the present embodiment will be described by way of example. The photosensitive drums 103 and the chargers 104 described above may be integrally unitized (drum unit and drum cartridge) together with the drum cleaning devices 8.

A drum unit 518 including the photosensitive drum 103 is attached to the image forming apparatus 1 of the present embodiment. The drum unit 518 is a cartridge to be replaced by an operator such as a user and a maintenance person. The drum unit 518 of the present embodiment rotatably supports the photosensitive drum 103. Specifically, the photosensitive drum 103 is rotatably supported by the frame body of the drum unit 518.

In addition, the development unit 641 separate from the drum unit 518 is attached to the image forming apparatus 1 of the present embodiment. The development unit 641 of the present embodiment is a cartridge in which the development device 106 and a toner storage portion illustrated in FIG. 2 are integrated. The development device 106 includes a development sleeve that is a developer carrying member for carrying a developer. The development unit 641 is provided with a plurality of gears for rotating screws for stirring the toner and the carrier. When these gears deteriorate over time, an operator detaches the development unit 641 from the apparatus body of the image forming apparatus 1 and replaces it. Further, a certain amount of toner is removed as residual toner from the development unit 641, and is conveyed to the collected toner container 5. The embodiment of the drum unit 518 and the development unit 641 may be a process cartridge in which the drum unit 518 and the development unit 641 are integrated.

(Basic Configuration of Optical Print Head)

Figure 3:
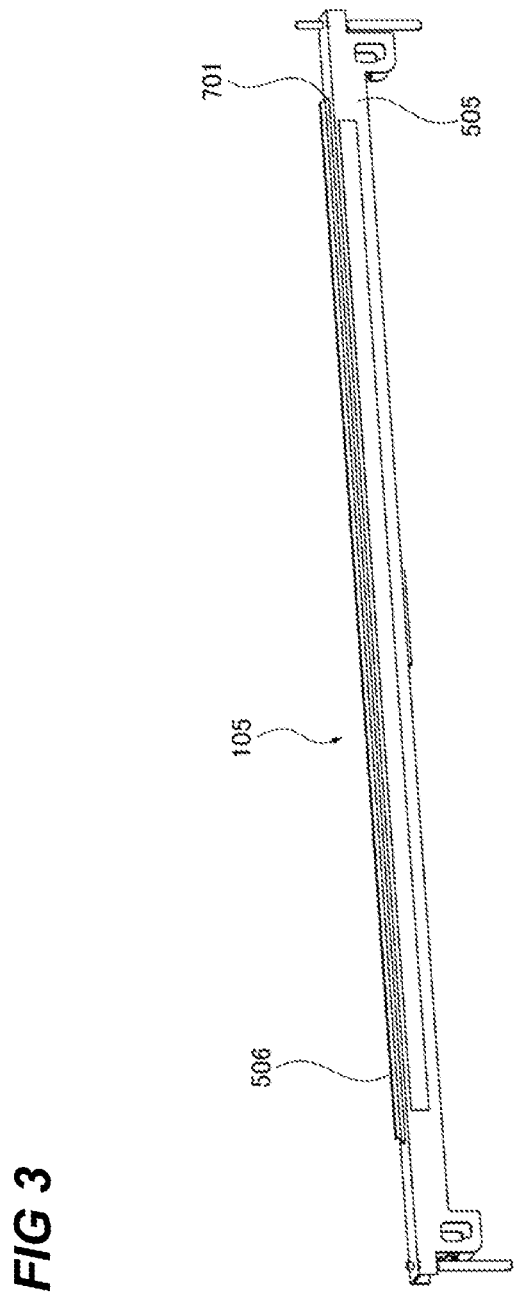
FIG. 3 is a perspective view of the optical print head.

Next, an optical print head 105 (see FIG. 3) included in the exposure units 500 will be described with reference to FIG. 3. FIG. 3 is a schematic perspective view of the optical print head 105 included in the image forming apparatus 1 of the present embodiment.

Here, as an example of an exposure system adopted in an electrophotographic system image forming apparatus, there is a laser beam scanning exposure system in which an irradiation beam of a semiconductor laser is scanned with a rotating polygon mirror and the like, and the photosensitive drum is exposed through an f-θ lens and the like. The "optical print head 105" described in the present embodiment is used for an LED exposure system that exposes the photosensitive drums 103 using light emitting elements such as LEDs arranged along the rotational axis direction of the photosensitive drums 103, and is not used for the laser beam scanning exposure system described above.

The optical print head 105 (exposure units 500) described in the present embodiment is provided on the lower side of the vertical direction than the rotational axis of the photosensitive drums 103, and the optical print head 105 exposes the photosensitive drums 103 from below.

As illustrated in FIG. 3, the optical print head 105 has a longitudinal shape extending in the rotational axis direction of the photosensitive drums 103. In addition, the optical print head 105 includes a holder 505, a lens array 506, and a substrate 502 (see FIGS. 4A to 4E). The lens array 506 and the substrate 502 are held by the holder 505. The holder 505 is, for example, a metal member formed by bending a plate material obtained by plating a galvanized steel plate or a cold-rolled steel plate. Here, the holder 505 in the present embodiment is a metal thin plate having a thickness of about 1 mm, and is a member obtained by processing an electrogalvanized steel plate with a press die.

Figure 4A:
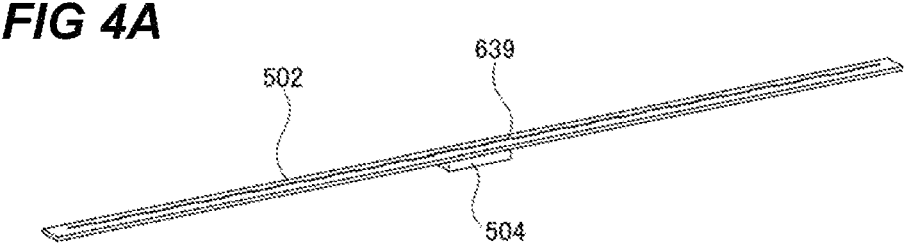
FIGS. 4A, 4B, and 4C are views illustrating the substrate in the optical print head.
Figure 4B:
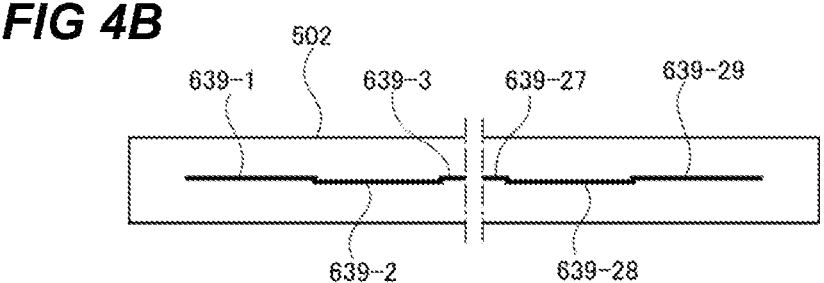
Figure 4C:
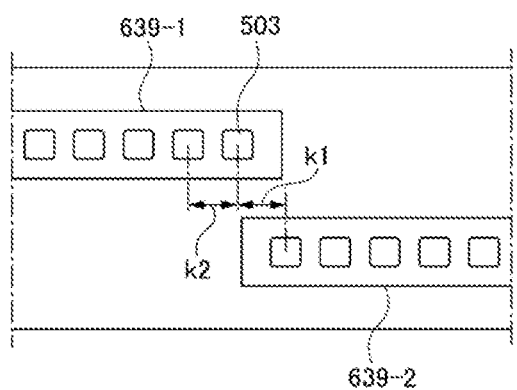

Next, the substrate 502 and the lens array 506 held by the holder 505 of the optical print head 105 will be described with reference to FIGS. 4A to 4E. First, the substrate 502 will be described. FIG. 4A is a schematic perspective view of the substrate 502. FIG. 4B illustrates an arrangement of a plurality of LEDs 503 provided on the substrate 502, and FIG. 4C illustrates an enlarged view of FIG. 4B.

LED chips 639 are mounted on the substrate 502. As illustrated in FIG. 4A, the LED chips 639 are provided on one surface of the substrate 502, and a long FFC connector 504 is provided on the other surface which is a surface opposite to the one surface. The FFC connector 504 is attached to the other surface of the substrate 502 in a manner that the longitudinal direction is along the longitudinal direction of the substrate 502. Wiring for supplying a signal to each of the LED chips 639 is provided on the substrate 502. One end of a flexible flat cable (FFC) (not illustrated) as an example of a cable is connected to the connector 504.

The apparatus body of the image forming apparatus 1 is provided with a substrate. The substrate includes a controller and a connector. The other end of the FFC is connected to the connector. That is, the FFC electrically connects the controller of the apparatus body and the substrate 502 of the optical print head 105. A control signal (drive signal) is input to the substrate 502 from a controller of the apparatus body of the image forming apparatus 1 via the FFC and the connector 504. The LED chips 639 mounted on the substrate 502 are driven by the control signal input to the substrate 502.

The LED chips 639 mounted on the substrate 502 will be described in more detail. As illustrated in FIGS. 4B and 4C, a plurality of LED chips 639-1 to 639-29 (29 chips) in which the plurality of LEDs 503 (an example of light emitting elements) is disposed is arranged on one surface of the substrate 502. In each of the LED chips 639-1 to 639-29, 516 LEDs 503 are arranged in a row in the longitudinal direction. In the longitudinal direction of the LED chips 639, a center-to-center distance k2 between the adjacent LEDs 503 corresponds to the resolution of the image forming apparatus 1. Since the resolution of the image forming apparatus 1 of the present embodiment is 1200 dpi, the LEDs 503 are arranged in a row in a manner that the center-to-center distance between the adjacent LEDs 503 is 21.16 μm in the longitudinal direction of the LED chips 639 of the LED chips 639-1 to 639-29. Therefore, the exposure range of the optical print head 105 of the present embodiment is about 314 mm. The photosensitive layer of the photosensitive drums 103 is formed to have a width of 314 mm or more. Since the length of the long side of the A4-size recording sheet and the length of the short side of the A3-size recording sheet are 297 mm, the optical print head 105 of the present embodiment has an exposure range in which an image can be formed on the A4-size recording sheet and the A3-size recording sheet.

The LED chips 639-1 to 639-29 are alternately disposed in two rows along the rotational axis direction of the photosensitive drums 103. That is, as shown in FIG. 4B, odd-numbered LED chips 639-1, 639-3, . . . 639-29 counted from the left side are mounted in a row in the longitudinal direction of the substrate 502, and even-numbered LED chips 639-2, 639-4, . . . 639-28 are mounted in a row in the longitudinal direction of the substrate 502. By disposing the LED chips 639 in this way, as illustrated in FIG. 4C, in the longitudinal direction of the LED chips 639, a center-to-center distance k1 of the LEDs 503 disposed at one end of one LED chip 639 and the other end of the other LED chip 639 in the different adjacent LED chips 639 can be made equal to the center-to-center distance k2 of the adjacent LEDs 503 on one LED chip 639.

In the present embodiment, a configuration in which the LEDs 503 are used as exposure light sources (light emitting elements) is exemplified, but organic electro luminescence (EL) may be used as an exposure light source.

Figure 4D:
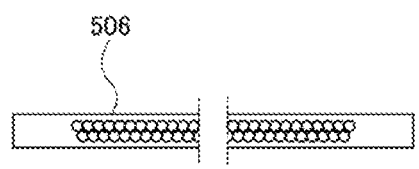
FIGS. 4D and 4E are views illustrating a lens array.
Figure 4E:
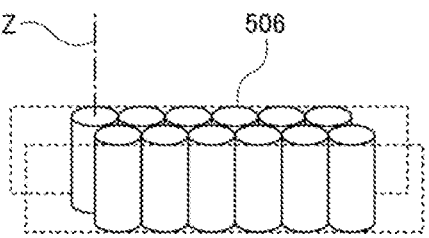

Next, the lens array 506 will be described. FIG. 4D is a schematic view of the lens array 506 as viewed from the side of the photosensitive drums 103. In addition, FIG. 4E is a schematic perspective view of the lens array 506. As illustrated in FIG. 4D, the lens array 506 includes a plurality of lenses that condenses light emitted from the LEDs 503, which are light emitting elements, on the photosensitive drums 103. The plurality of lenses is arranged in two rows along the arrangement direction of the plurality of LEDs 503. Each lens is alternately disposed in a manner that one of the lenses in the other row is disposed to be in contact with both of the adjacent lenses in the arrangement direction of the lenses in one row. Each lens is a cylindrical rod lens made of glass. Each lens has a light incident surface on which the light emitted from the LEDs 503 enters and a light emitting surface from which the light entered from the light incident surface is emitted. The material of the lens is not limited to glass, and may be plastic. The shape of the lens is not limited to the cylindrical shape, and may be, for example, a polygonal prism such as a hexagonal prism.

A dotted line Z illustrated in FIG. 4E indicates the optical axis of the lens. The optical print head 105 is movable in a direction (up-and-down direction) substantially along the optical axis of the lens indicated by the dotted line Z by a moving mechanism (not illustrated). The optical axis of the lens here means a line connecting the center of the light emitting surface of the lens and the focal point of the lens. The radiation light emitted from the LEDs 503 enters the lenses included in the lens array 506. The lenses included in the lens array 506 have a function of condensing entered radiation light on the surface of the photosensitive drums 103. Regarding the lens array 506, the attachment position with respect to the lens attachment portion 701 (see FIG. 3) of the optical print head 105 is adjusted when the optical print head 105 is assembled. As a result, in the lens array 506, the distance from the luminescent surface of the LEDs 503 to the light incident surface of the lenses is substantially equal to the distance from the light emitting surface of the lenses to the surface of the photosensitive drums 103.

Figure 5:
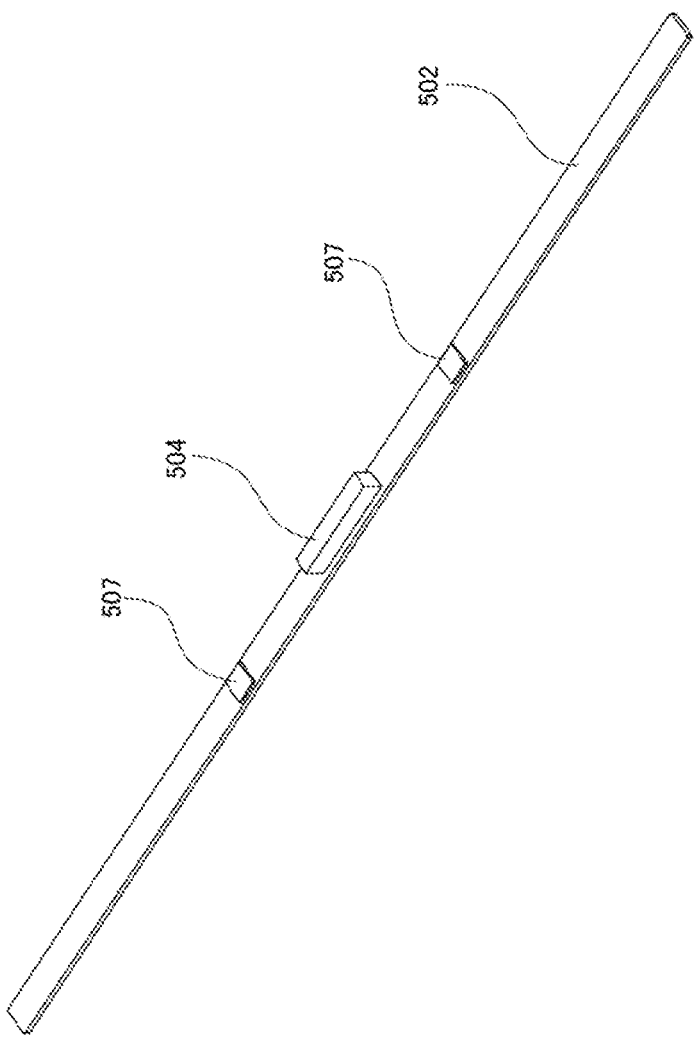
FIG. 5 is a perspective view of the substrate in the optical print head.
Figure 6:
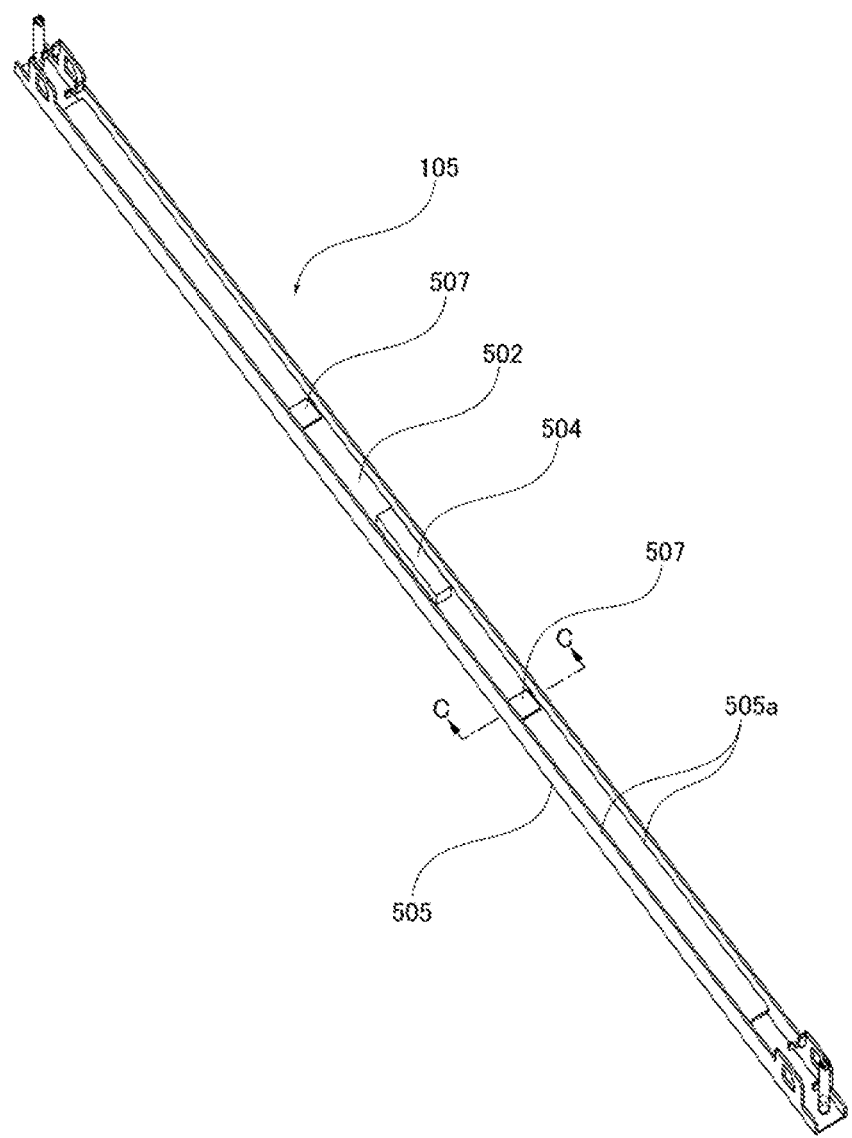
FIG. 6 is a perspective view illustrating a state in which the substrate is held by a holder.
Figure 7:
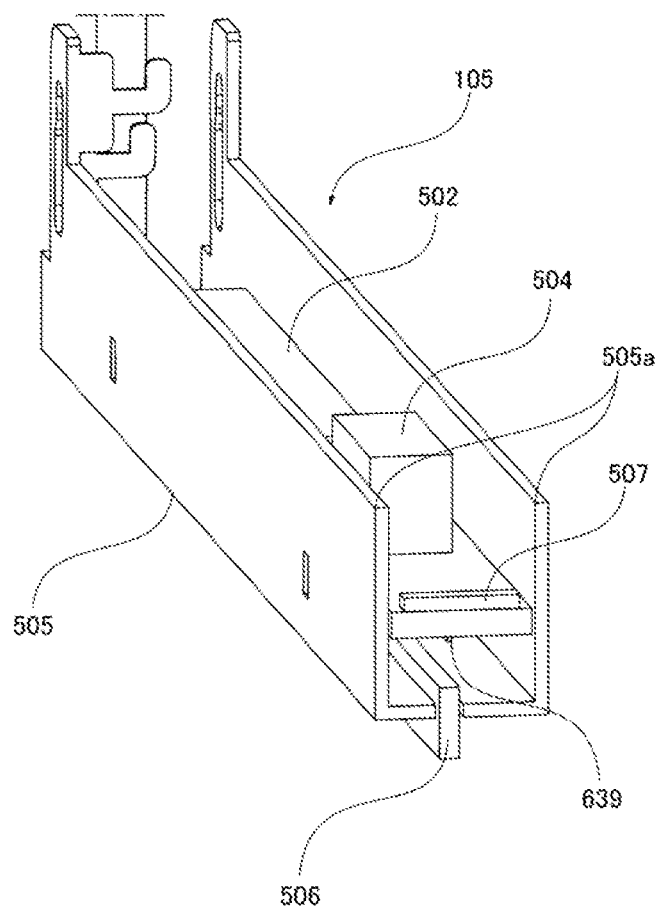
FIG. 7 is a cross-sectional view of the optical print head.

Next, the configuration of the substrate 502 in the optical print head 105 of the present embodiment will be described in more detail with reference to FIGS. 5, 6, and 7. FIG. 5 is a perspective view illustrating the substrate 502 in the optical print head 105. FIG. 5 is a perspective view of the substrate 502 as viewed from a direction in which the FFC connector 504 is mounted. FIG. 6 is a perspective view illustrating a state in which the substrate 502 is held by the holder 505. FIG. 7 is a cross-sectional perspective view when cut on a driver IC 507 in FIG. 6 (place indicated by arrows C in the drawing).

As described above, the LEDs 503 (LED chips 639), which are a plurality of light emitting elements, are mounted on one surface of the substrate 502 (see FIGS. 4A to 4E).

In addition, as illustrated in FIG. 5, on the other surface opposite to the one surface of the substrate 502, the FFC connector 504 has an electronic component and the driver ICs 507 for emitting and controlling the LEDs 503 are mounted.

The FFC connector 504 is provided at the center in the longitudinal direction on the other surface of the substrate 502. The driver ICs 507 are provided on both sides of the FFC connector 504 on the other surface of the substrate 502. The driver ICs 507 are active elements or passive elements that generate heat when the LEDs 503 produce and control light. Note that, in order to simplify the description, electronic components such as resistors and capacitors other than the driver ICs 507 and the FFC connector 504 among the electronic components mounted on the other surface of the substrate 502 are not illustrated. The driver IC 507 used in the present embodiment is an IC chip having a size of 8 mm square and a thickness of 0.85 mm, and a plurality of electrode pads on the back surface of the IC chip and electrodes on the substrate 502 are electrically connected by solder.

As illustrated in FIGS. 6 and 7, the substrate 502 and the lens array 506 are adjusted to predetermined positions and then fixed to the holder 505 with an adhesive. At that time, the substrate 502 is fixed to wall surfaces 505a of the holder 505 on both sides of the substrate 502 by multi-point adhesion. The wall surfaces 505a of the holder 505 are located on both sides of the driver ICs 507 of the substrate 502.

In this manner, the optical print head 105 is manufactured by fixing the substrate 502 and the lens array 506 to the holder 505. In the method for manufacturing the optical print head 105, the shape and manufacturing process of the substrate 502 fixed to the holder 505 will be described.

(Detailed Shape of Substrate)

Figure 8:
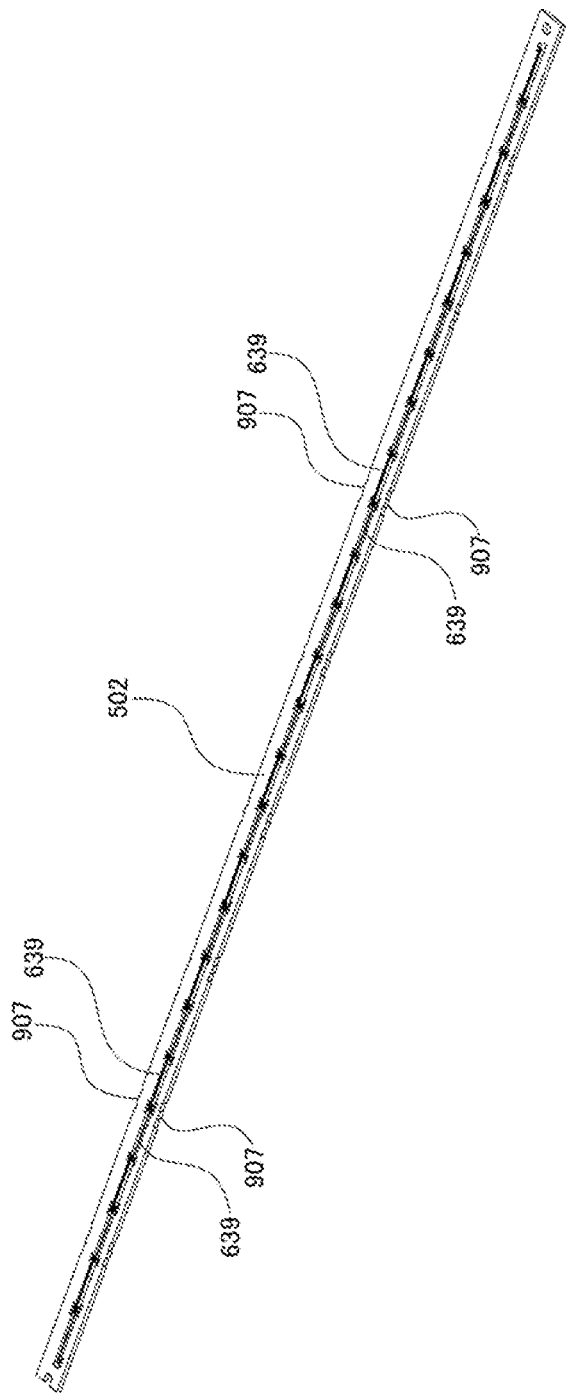
FIG. 8 is a perspective view of the substrate in the optical print head.
Figure 9:
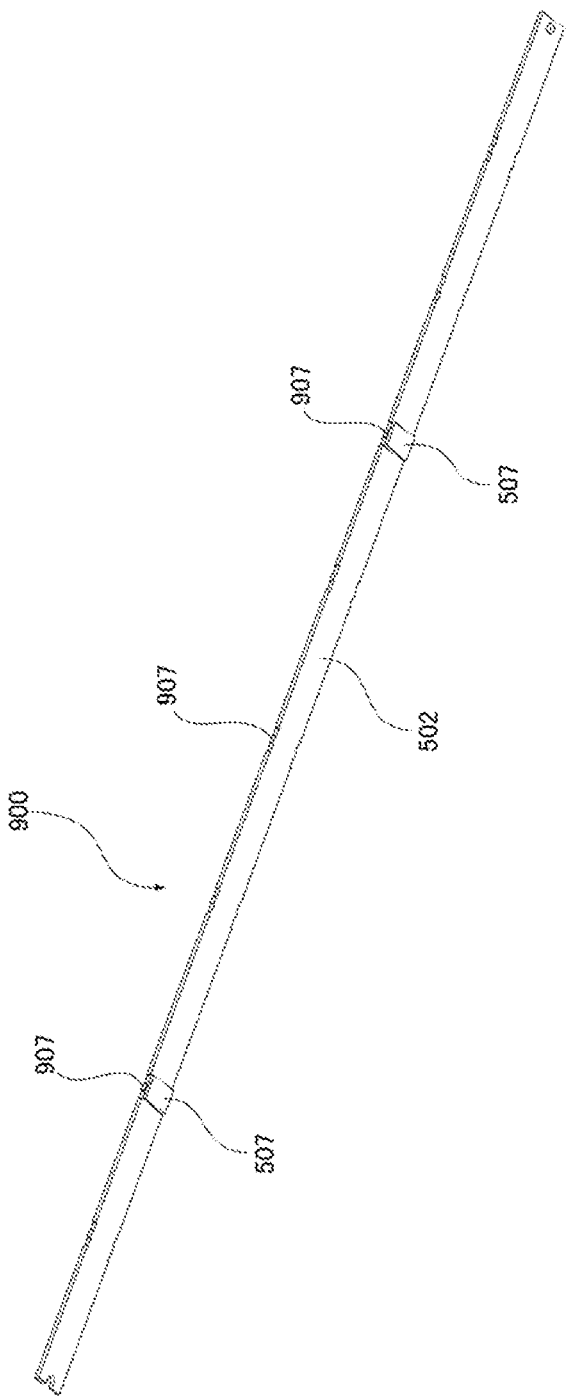
FIG. 9 is a perspective view of the substrate in the optical print head.

First, a detailed shape of the substrate 502 of the present embodiment will be described with reference to FIGS. 8 and 9. The substrate 502 illustrated in FIGS. 8 and 9 is obtained through a manufacturing process of the substrate 502 described below FIG. 8 is a perspective view of the front surface of the substrate 502 on which the LED chips 639 are mounted as viewed from above, and FIG. 9 is a perspective view of the back surface of the substrate 502 as viewed from below. Note that, in FIG. 9, electronic components such as resistors, capacitors and connectors mounted on the back surface of the substrate are omitted. As illustrated in FIG. 9, two driver ICs 507 are mounted on the back surface of the substrate 502.

As illustrated in FIG. 8, in the substrate 502, a plurality of LED chips 639 including a plurality of light emitting elements on one surface is mounted in the longitudinal direction of the substrate 502. In addition, as illustrated in FIG. 9, in the substrate 502, two driver ICs 507 for driving the plurality of light emitting elements are mounted on the other surface opposite to the one surface.

As illustrated in FIGS. 8 and 9, the substrate 502 includes a plurality of connecting pieces 907 obtained by cutting the connecting portion 906 (see FIG. 10) with another adjacent substrate in the longitudinal direction of the substrate 502. The substrate 502 has at least one connecting piece 907 of the connecting pieces 907 at a position corresponding to a region of the substrate 502 where the driver IC 507 is mounted in the longitudinal direction of the substrate 502.

In addition, on the other surface of the substrate 502, in the region excluding the mounting position of the driver IC 507, at least 1.5 mm from both ends in the lateral direction orthogonal to the longitudinal direction of the substrate 502 is set as a region where other electronic components except for the driver IC are not mounted.

In addition, on one surface of the substrate 502, that is, on a surface of the substrate 502 on which the plurality of light emitting elements is mounted, the LED chips 639 including the light emitting elements are mounted in a region where the driver IC 507 is mounted.

Figure 10:
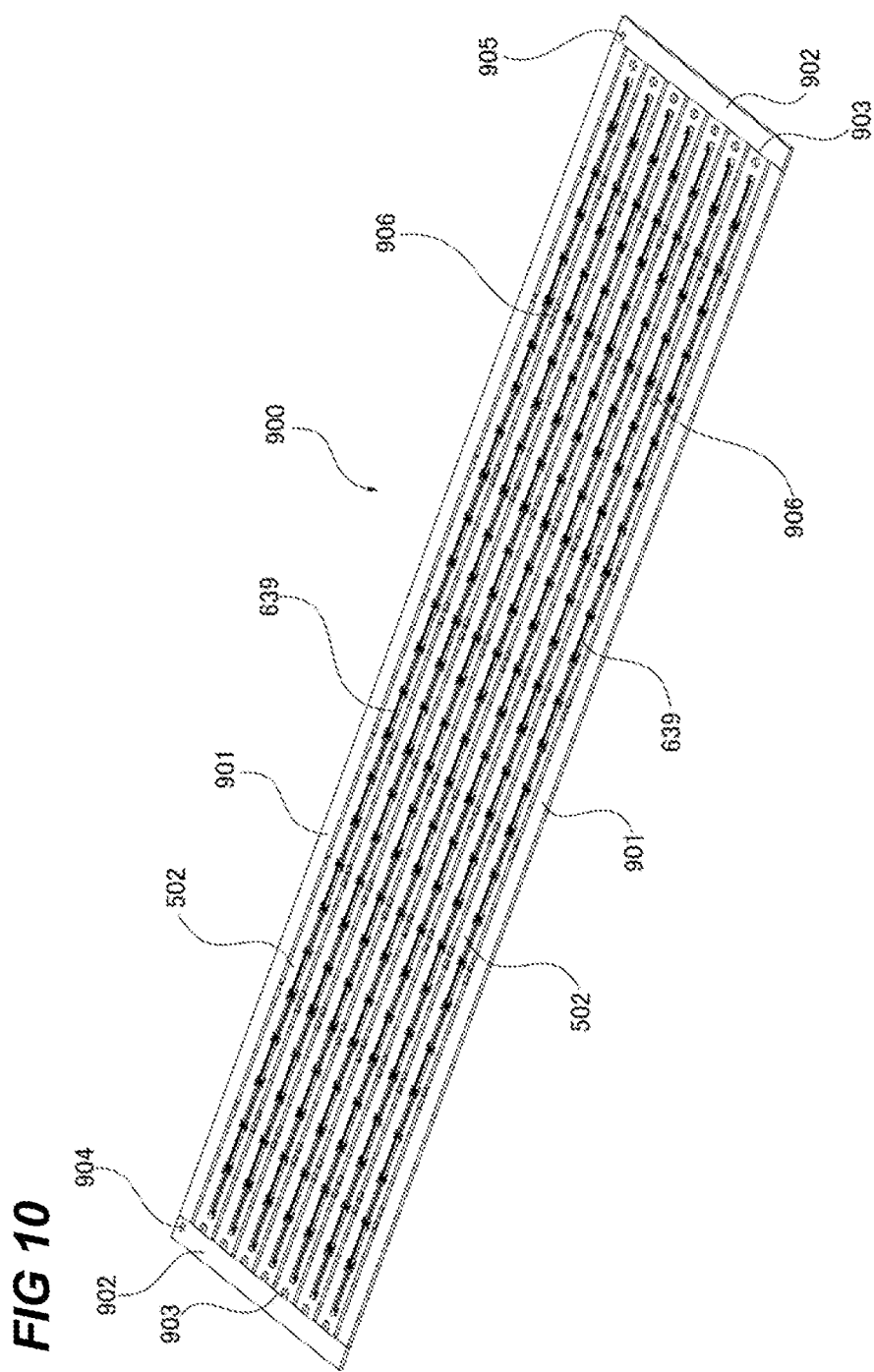
FIG. 10 is a perspective view of an assembly in which a plurality of substrates is connected.

Next, a manufacturing process of the substrate of the present embodiment will be described with reference to FIGS. 1 and 10 to 16. FIG. 10 is a perspective view of a state in which a plurality of substrates 502 is connected in the process of manufacturing the substrates 502, and FIG. 11 is an enlarged view of a part thereof.

Figure 11:
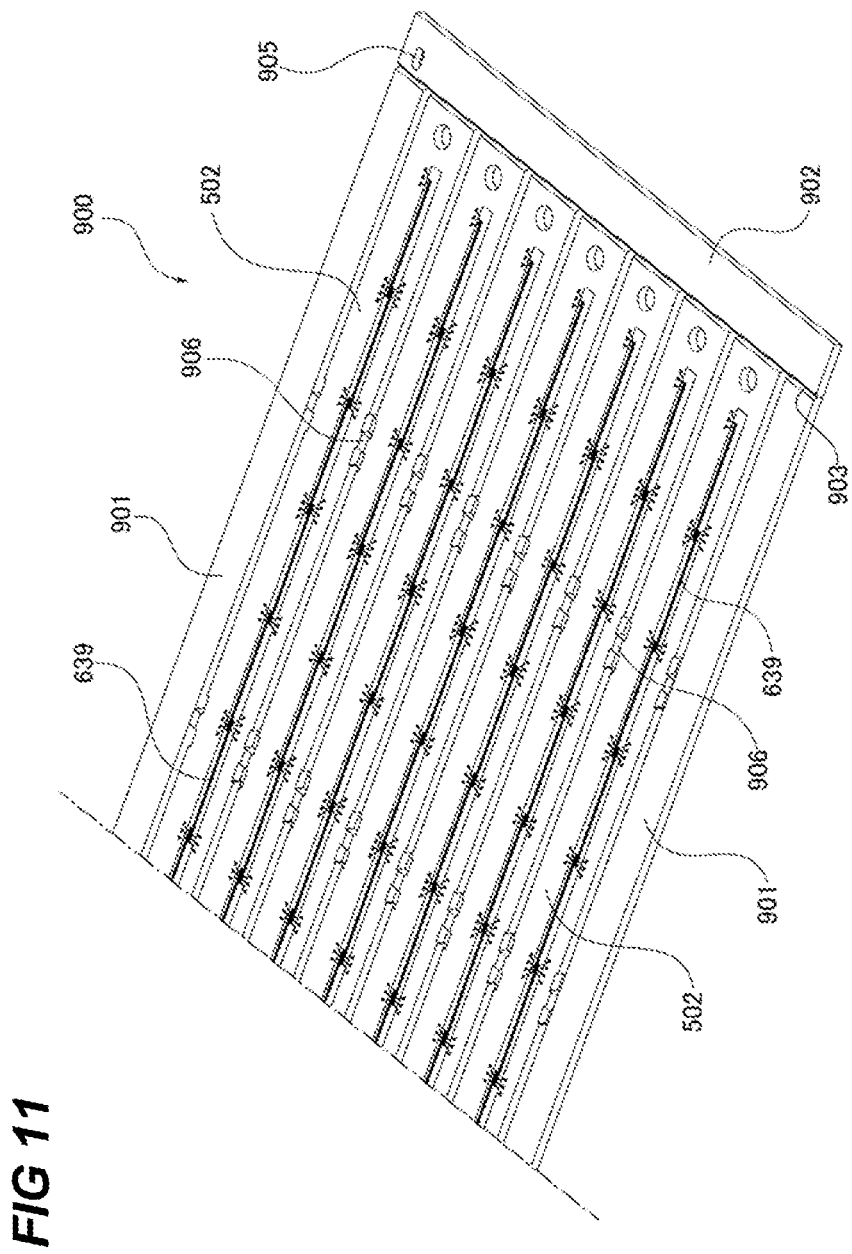
FIG. 11 is an enlarged perspective view of a part of the assembly in which the plurality of substrates is connected.

As illustrated in FIGS. 10 and 11, the substrate 502 is an assembly 900 in which the plurality of substrates 502 is connected by the plurality of connecting portions 906. The substrates 502 are connected by connecting portions 906 at a plurality of positions in the longitudinal direction of the substrates 502. Outer pieces 901 are disposed on both outer sides in the lateral direction of the plurality of substrates 502 connected by the connecting portions 906. The outer pieces 901 are provided over the longitudinal direction similarly to the plurality of substrates 502. One outer piece 901 in the lateral direction and the substrates 502 adjacent thereto, and the other outer piece 901 and the substrates 502 adjacent thereto are connected by connecting portions 906 at a plurality of positions in the longitudinal direction of the substrates 502, similarly to the other substrates 502. In addition, the outer pieces 902 are disposed on both outer sides in the longitudinal direction of the plurality of substrates 502 and outer pieces 901 connected by the connecting portions 906. The plurality of substrates 502 connected by the connecting portions 906 and the longitudinal ends of the outer pieces 901 are connected to the outer pieces 902. A V-shaped groove 903 is provided at the boundary between the substrates 502 and the outer pieces 902 to be easily cut in the later process.

In addition, the outer pieces 902 located at both ends in the longitudinal direction of the substrates 502 are provided with a round hole 904 and a long round hole 905 for positioning with respect to the jig to be described later. One outer piece 902 is provided with the round hole 904, and the other outer piece 902 is provided with the long round hole 905.

In the process of manufacturing the substrate 502 illustrated in FIGS. 8 and 9, the assembly 900 in which the plurality of substrates 502 is connected by the plurality of connecting portions 906 is in the initial state (initial shape). In this state, first, electronic components such as resistors, capacitors and driver ICs 507 are collectively mounted on the other surface of each the substrates 502 forming the assembly 900. That is, a process of mounting the driver ICs 507 on the other surface of the assembly 900 opposite to the one surface of each of the substrates 502 is performed.

Next, a plurality of LED chips 639 including a plurality of light emitting elements (LED) is mounted on one surface of each of the substrates 502 forming the assembly 900 in the longitudinal direction. That is, a process of mounting the plurality of light emitting elements (LED) on one surface of each of the substrates 502 in the assembly 900 is performed.

After that, wire bonding is performed on the LED chips 639 mounted on the substrates 502. That is, a process of performing wire bonding on the plurality of light emitting elements (LED) of each of the substrates 502 is performed.

Finally, the substrates 502 forming the assembly 900 are cut one by one. That is, a process of cutting the plurality of connecting portions 906 is performed. Further, the outer pieces 902 and the plurality of substrates 502 and the outer piece 901 are cut. Note that a method for cutting the connecting portions 906 is router processing, laser cutting processing, and the like. The cutting of the V-shaped groove 903 at the boundary between the substrates 502 and the outer pieces 902 is V-cut processing in which a sharp metal jig and the like is pressed against the V-shaped groove 903 to break the V-shaped groove.

Through such processes, the single substrate 502 (see FIGS. 8 and 9) on which the light emitting elements and the driver ICs are mounted is obtained from the assembly 900 in the initial state.

As illustrated in FIGS. 8 and 9, the single substrate 502 obtained through the above processes includes a plurality of connecting pieces 907 obtained by cutting the connecting portion 906 with another adjacent substrate 502 in the longitudinal direction of the substrate 502. Among the connecting pieces 907, at least one connecting piece 907 is at a position corresponding to a region of the substrate 502 where the driver IC 507 is mounted in the longitudinal direction of the substrate 502.

Here, a wire bonding method for connecting the substrate and light emitting elements mounted on the substrate by a wire protruding from the tip of the capillary will be described with reference to FIGS. 17A to 19E.

FIGS. 17A to 19E are views for describing processes of wire bonding in the present embodiment. Although a wire 16 is a thin conductive wire having a diameter of about 10 to 150 µm, the wire 16 is illustrated to be thick in each drawing for easy understanding of the description.

Figure 17A:
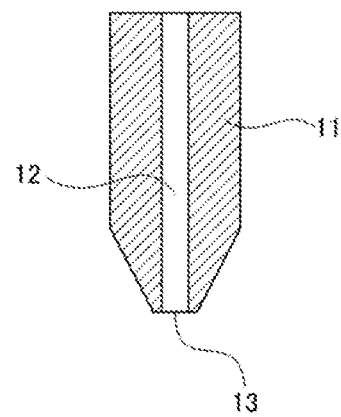
FIGS. 17A and 17B are views for describing a process of wire bonding.
Figure 17B:
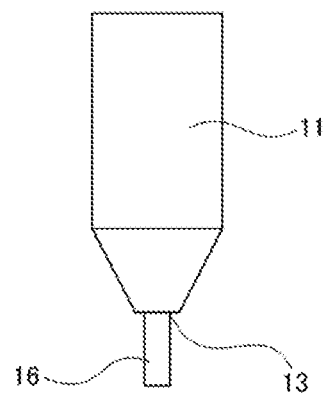
Figure 18A:
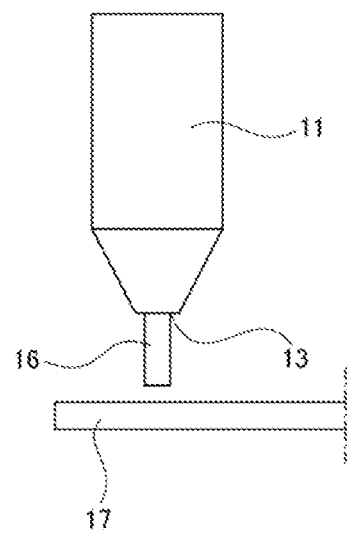
FIGS. 18A and 18B are views for describing a process of wire bonding.
Figure 18B:
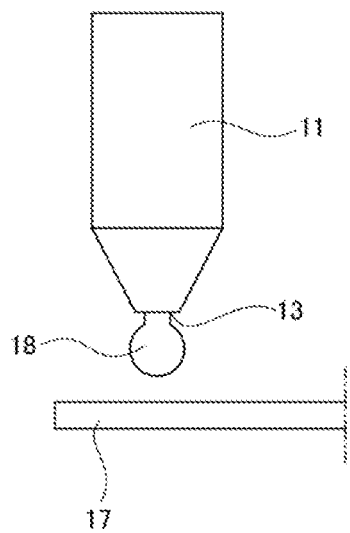

As illustrated in FIG. 17A, a capillary 11 in the present embodiment has a through hole 12 for supplying a wire to the center portion. The material of the capillary may be ceramic, ruby, zirconium oxide, and the like. First, as illustrated in FIG. 17B, a predetermined amount of the wire 16 is supplied from a tip 13 of the capillary 11. Then, as illustrated in FIG. 18A, a torch 17 forming a part of the wire bonding machine is positioned in the vicinity of the wire 16 protruding from the tip 13 of the capillary 11, and a voltage is applied between the wire 16 and the torch 17. The wire 16 protruding from the tip 13 of the capillary 11 is melted by the resultant sparks, and a ball 18 is formed as illustrated in FIG. 18B.

Figure 19A:
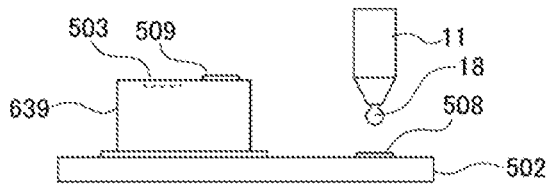
FIGS. 19A to 19E are views for describing a process of wire bonding.

FIGS. 19A to 19E are schematic views of the substrate 502 on which a wiring pattern 508 is formed on the substrate 502 and the light emitting element array chip 639 as an electronic component is mounted as viewed from the side surface. In FIGS. 19A to 19E, the light emitting element array chip 639 is illustrated as an electronic component, but the electronic component is not limited to this. As illustrated in FIG. 19A, the capillary 11 in which the ball 18 is formed is moved directly above the wiring pattern 508 using a wire bonding machine (not illustrated).

Figure 19B:
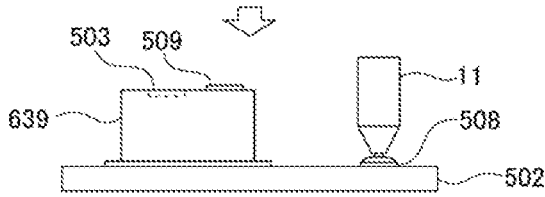
Figure 19C:
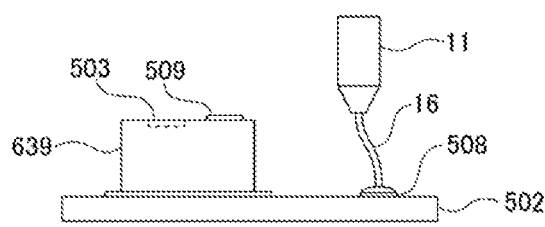
Figure 19D:
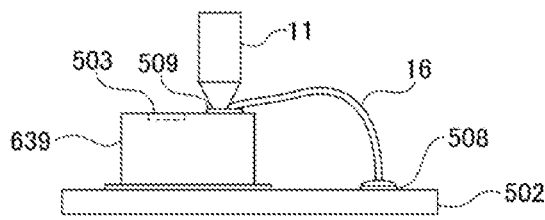
Figure 19E:
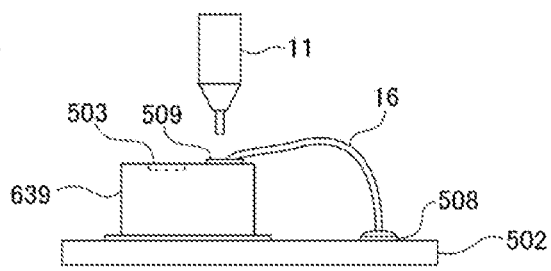

Then, as illustrated in FIG. 19B, the capillary 11 is lowered using a wire bonding machine (not illustrated), the ball 18 melted by the capillary 11 is pressed against the wiring pattern 508, and the wire 16 and the wiring pattern 508 are connected by, for example, an ultrasonic combination thermocompression bonding method. After that, as illustrated in FIG. 19C, the wire 16 is moved toward an element pad 509 of the light emitting element array chip 639 while being pulled out from the tip 13 of the capillary 11 using a wire bonding machine (not illustrated). Then, as illustrated in FIGS. 19D and 19E, the capillary 11 is pressed against the element pad 509 using a wire bonding machine (not illustrated), the wire 16 is connected to the element pad 509 by the ultrasonic combination thermocompression bonding method, and at the same time, the wire 16 is cut.

Wire bonding is performed on the plurality of light emitting elements of each of the substrates 502 using this wire bonding method.

Figure 12:
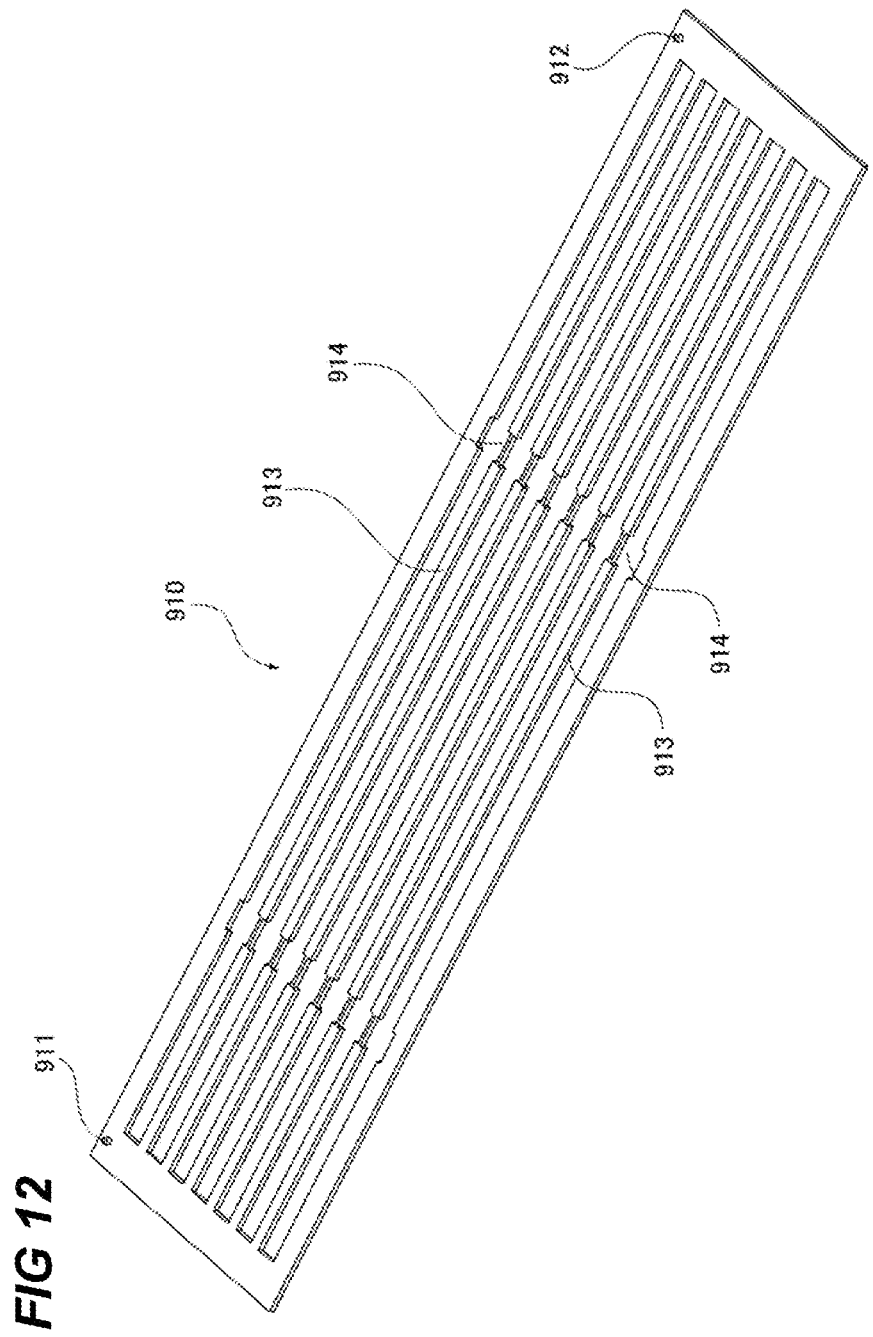
FIG. 12 is a perspective view of a jig that supports the assembly.

Next, a process of performing wire bonding on the LED chips 639 mounted on the substrates in the connected state will be described in detail with reference to FIGS. 1 and 12 to 16. FIG. 12 is a perspective view of a jig 910 used in the wire bonding process, and FIG. 13 is an enlarged view of a part thereof.

The process of performing wire bonding on the plurality of light emitting elements of the substrates 502 is performed in a state in which both sides in the lateral direction of the surface of each of the substrates 502 on which the driver ICs 507 are mounted in the assembly 900 are supported by the jig 910 along the longitudinal direction.

As illustrated in FIG. 12, positioning bosses 911 and 912 protrude from both ends in the longitudinal direction of the jig 910. In addition, in the jig 910, a plurality of rows of backups 913 for supporting both ends in the lateral direction of each of the substrates 502 in the assembly 900 from the back surface of the substrate in the longitudinal direction is disposed.

Figure 13:
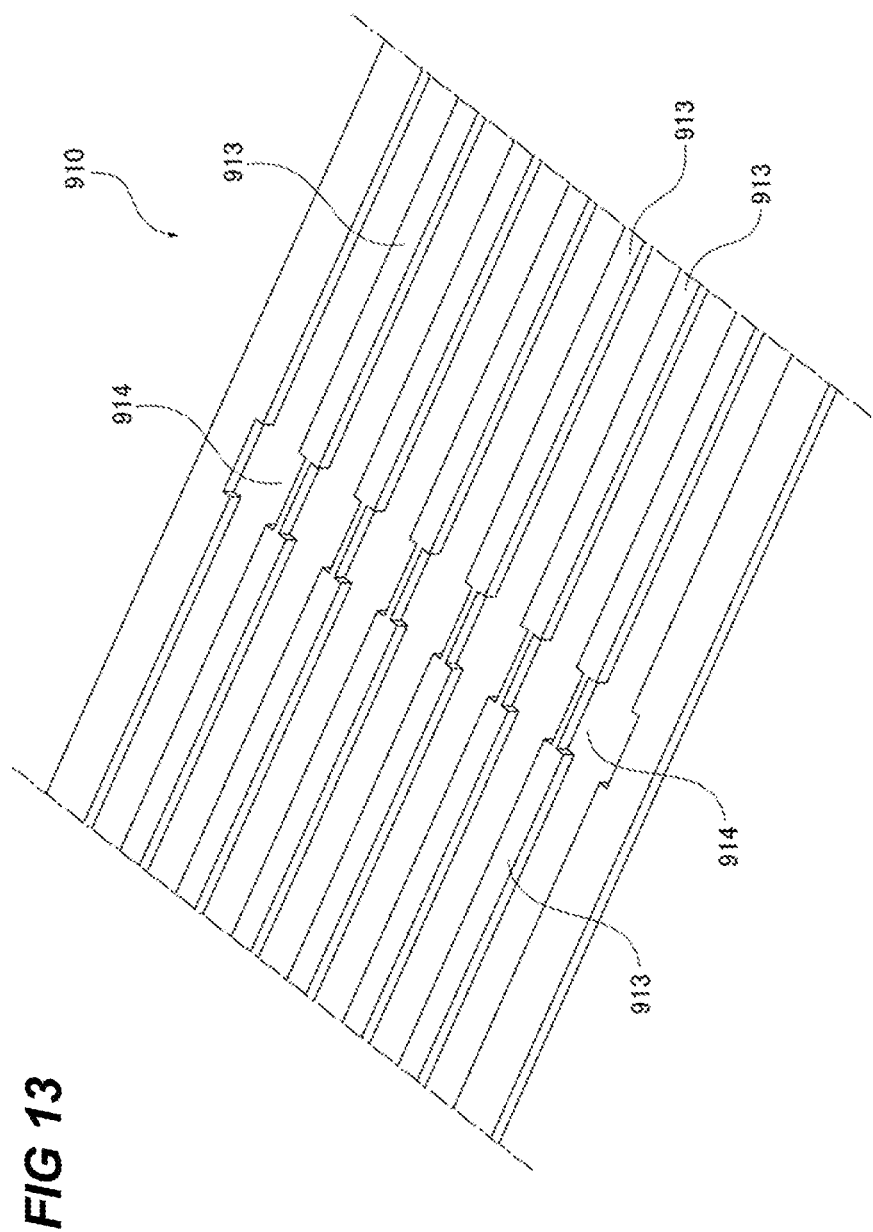
FIG. 13 is an enlarged perspective view of a part of the jig that supports the assembly.

As illustrated in FIG. 13, the backups 913 are provided with recesses 914. The recesses 914 are provided at positions corresponding to the mounting positions of the driver ICs 507 on each of the substrates 502 in the assembly 900. As a result, when the back surface of the substrate is supported by the jig 910, each of the substrates 502 can be supported while avoiding the mounting positions of the driver ICs 507.

Figure 14:
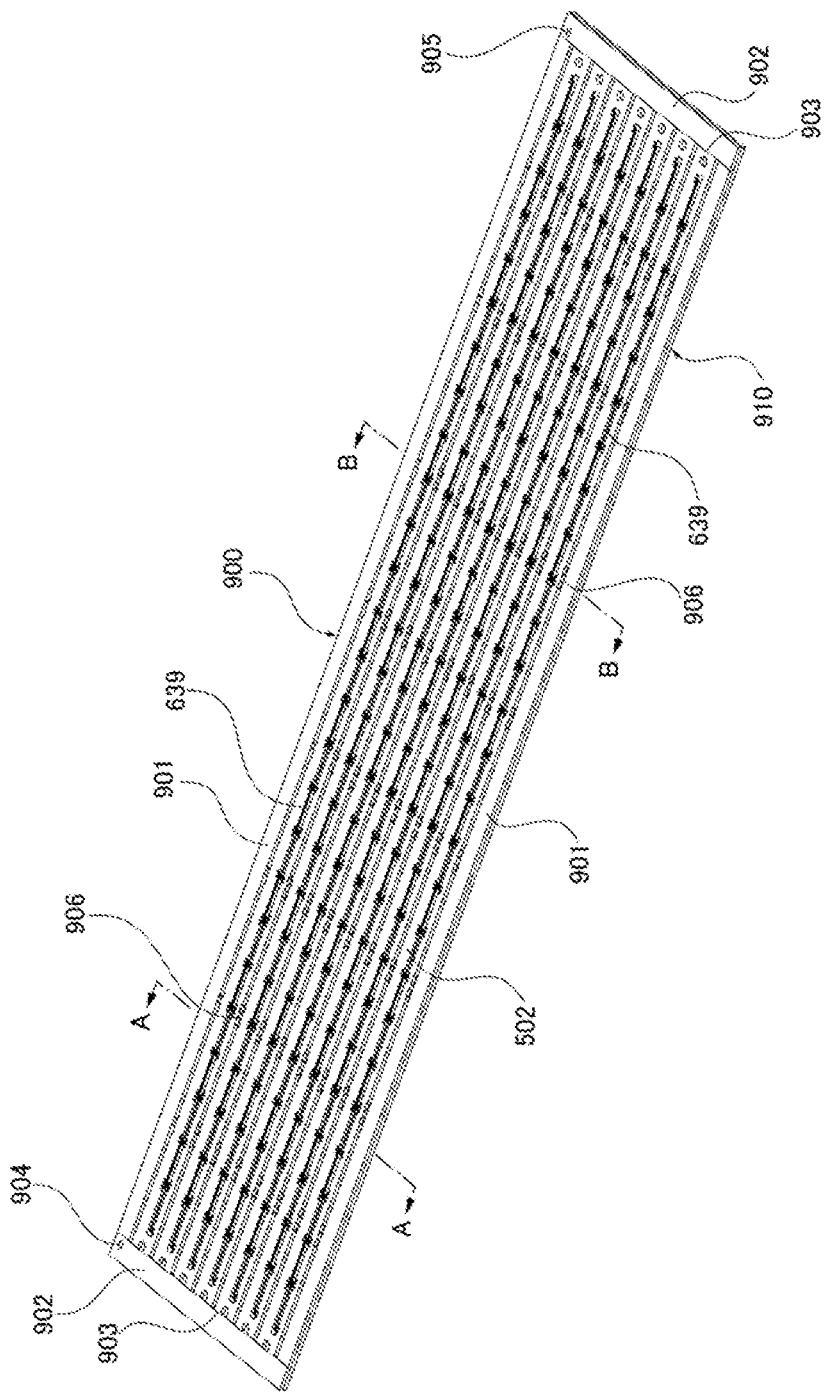
FIG. 14 is a perspective view of the assembly to which the plurality of substrates is connected and the jig that supports the assembly.

FIG. 14 is a perspective view illustrating a state in which the assembly 900 including the plurality of connected substrates 502 is installed on the jig 910. The round hole 904 and the long round hole 905 of the assembly 900 are respectively fitted to the positioning bosses 911 and 912 of the jig 910, and the relative position is determined. Although not illustrated in FIG. 14, the outer periphery of the substrates 502 connected on the jig 910 is clamped so as not to move in the wire bonding process.

Figure 15:
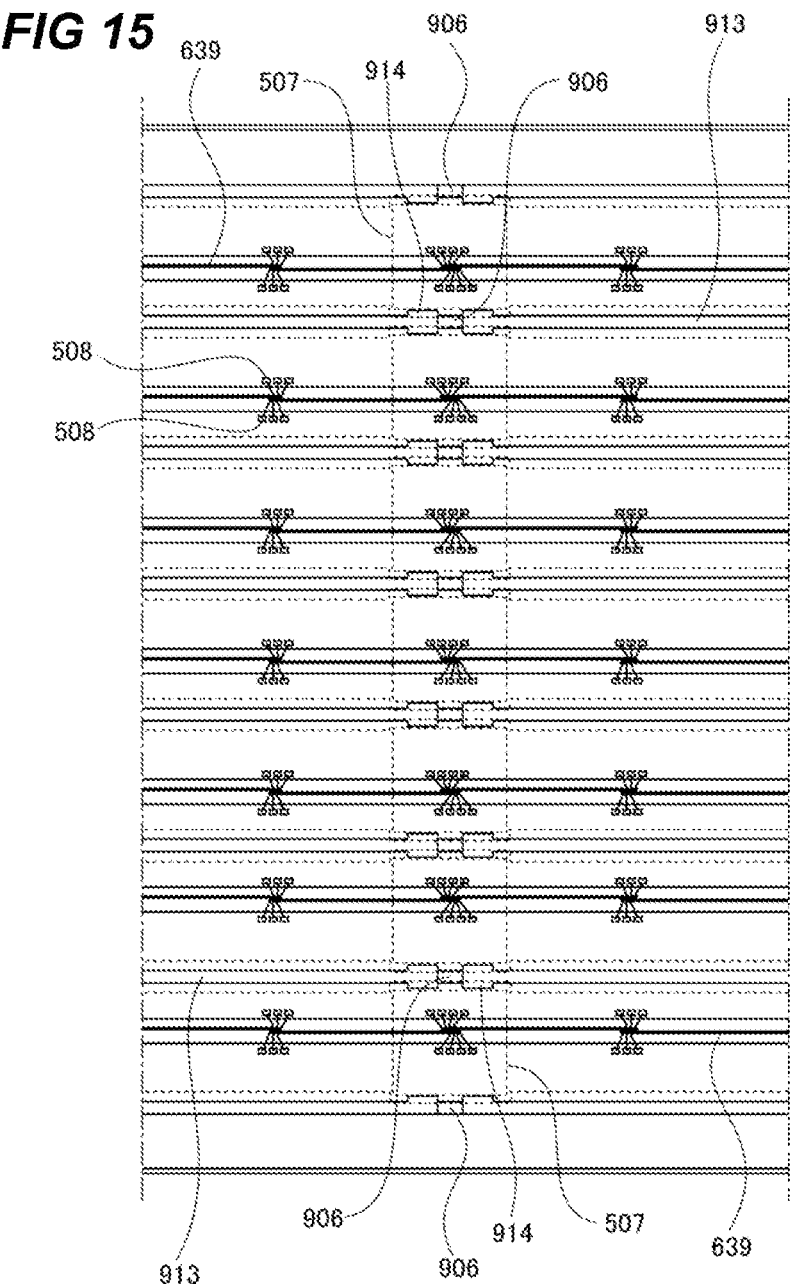
FIG. 15 is an enlarged view of a main part of the assembly and the jig.
Figure 16:
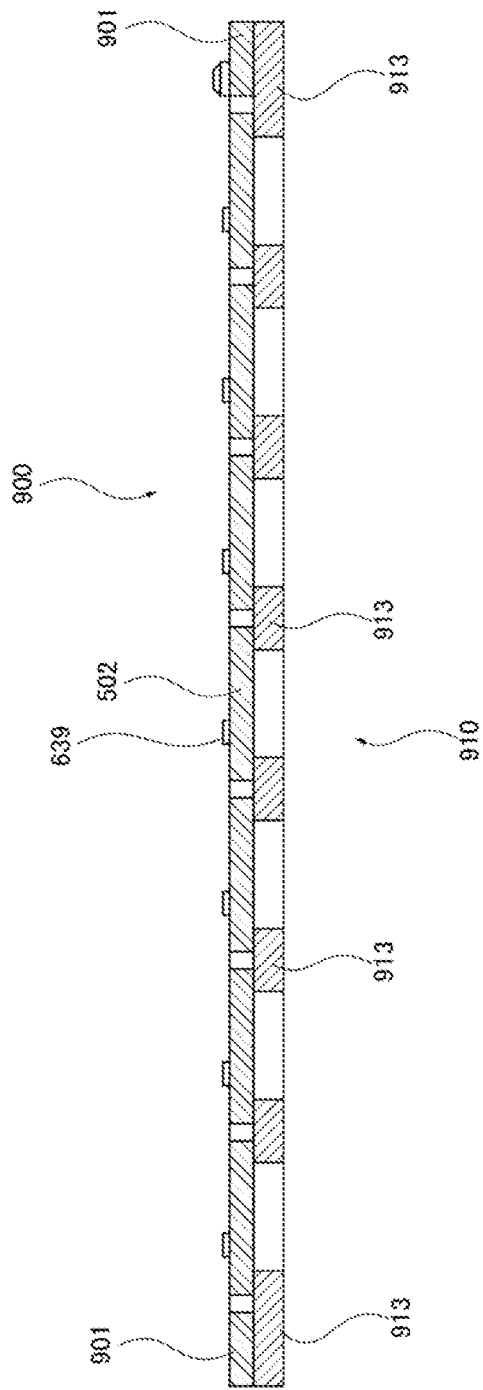
FIG. 16 is a cross-sectional view of the substrate in the optical print head.

FIG. 15 is an enlarged view of a part of FIG. 14, and shapes on the back surface are indicated by dotted lines for description. In addition, FIG. 16 is a cross-sectional view illustrating a portion of a cutting line A in FIG. 14. As illustrated in FIGS. 15 and 16, in each of the substrates 502 forming the assembly 900, each of the backups 913 of the jig 910 supports both ends in the lateral direction of each of the substrates 502 of the assembly 900 at positions where there is no driver ICs 507 in the longitudinal direction of the substrates 502. If an electronic component is not mounted on the support region of the substrates 502, the substrates 502 can be supported by the jig 910 without backlash. For example, regarding the substrate 502, in the longitudinal direction of the substrate 502, in the region excluding the mounting position of the driver IC 507, at least 1.5 mm from both ends in the lateral direction orthogonal to the longitudinal direction of the substrate 502 is set as a region where other electronic components except for the driver IC are not mounted. In this way, both ends in the lateral direction of each of the substrates 502 of the assembly 900 can be reliably supported by each of the backups 913 of the jig 910 without backlash.

On the other hand, on the other surface of the substrates 502, the region where the driver ICs 507 are mounted has a larger proportion of the driver ICs 507 in the lateral direction of the substrates 502 than the area excluding the mounting position of the driver ICs 507 (see FIG. 9). Therefore, at the mounting positions of the driver ICs 507 in the longitudinal direction of the substrates 502, the backups 913 of the jig 910 interfere with the driver ICs 507 mounted on the substrates 502.

Figure 1:
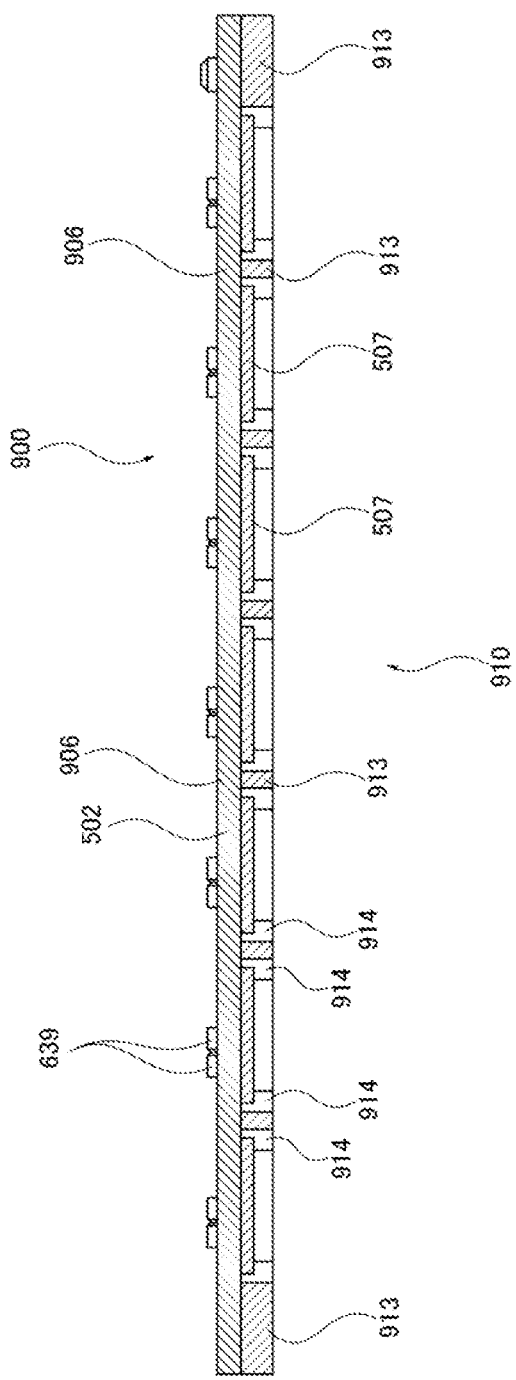
FIG. 1 is a cross-sectional view of a substrate in an optical print head.

Therefore, in the present embodiment, the jig 910 is provided with the recesses 914 for avoiding the driver ICs 507 in the backups 913 in regions corresponding to the mounting positions of the driver ICs 507 on the substrates 502 (see FIGS. 12 and 13). Regarding the recesses 914, when the relative position is determined by fitting the round hole 904 and the long round hole 905 of the assembly 900 to the positioning bosses 911 and 912 of the jig 910, the position with respect to each of the driver ICs 507 is also determined. As a result, as illustrated in FIG. 1, it is shown that the driver IC 507 of each of the substrates 502 and each of the backups 913 of the jig 910 do not interfere with each other because of the recesses 914. FIG. 1 is a cross-sectional view illustrating a portion of a cutting line B in FIG. 14.

On the other hand, if the mounting positions of the driver ICs 507 of each of the substrates 502 are avoided by the recesses 914, the entire region in the longitudinal direction of the substrate 502 cannot be supported from the back surface of the substrate. Here, in the wire bonding process, a pressing force of about 100 gf is applied to the substrate from the capillary. Therefore, the substrate 502 may be bent by the above pressing force at the portion that cannot be supported by the backups 913 of the jig 910, and the bonding strength between the wire and the LED chips 639 and the bonding strength between the wire and the substrate 502 may be lowered. In this case, when an impact and the like are applied to the substrate 502, the connection with the wire may be cut off in some cases, and conduction failure may occur.

Therefore, in the present embodiment, as illustrated in FIG. 15, in the assembly 900 formed by connecting the plurality of substrates 502, connecting portions 906 are provided at positions where the driver ICs 507 are mounted to connect the plurality of substrates 502. At the mounting positions of the driver ICs 507 on each of the substrates 502, not the end in the lateral direction of each of the substrates 502 but each of the connecting portions 906 connecting the substrate 502 and the substrate 502 is supported by the jig 910 from the back surface of the substrate. As a result, when a pressing force is applied to the substrate 502 in the wire bonding process, the bending of the substrate 502 is suppressed.

As illustrated in FIG. 1, the backups 913 located in the recesses 914 support the connecting portions 906 from below, in a manner that the strength of wire bonding does not decrease even at the positions where the driver ICs 507 exist.

Here, a configuration in which the connecting portions 906 are not provided at the mounting positions of the driver ICs 507 is set as a comparative example, and this comparative example is compared with the above present embodiment. In the case of the comparative example, since there is no connecting portion at the mounting positions of the driver ICs 507, in order to suppress the bending of the substrate 502 at the time of performing wire bonding, it is necessary to provide a support region by the jig 910 at the mounting positions of the driver ICs 507 while suppressing interference with the driver ICs 507. That is, in the substrate of the comparative example, it is necessary to increase the length of each of the substrates 502 in the lateral direction as compared with the present embodiment. In this case, the length in the lateral direction of the substrate 502 finally cut into one sheet becomes long, which leads to an increase in size of the optical print head 105.

On the other hand, according to the present embodiment, it is possible to suppress the bending of the region of the substrate on which the electronic components are mounted because of the pressing force at the time of performing the wire bonding without increasing the size of the optical print head 105.

In the present configuration, the connecting piece 907 located in the driver IC 507 is provided at the central portion of the driver IC 507 in the longitudinal direction of the substrate, but the present invention is not limited to this. For example, there may be a shape over the entire length of the driver IC 507, or there may be a plurality of short connecting pieces. That is, the pressing force from the capillary may be supported by the backup 913.

In the above embodiment, four image forming portions are used, but the number of image forming portions used is not limited, and may be appropriately set as necessary.

Further, in the above embodiment, the printer has been exemplified as the image forming apparatus, but the present invention is not limited to this. For example, another image forming apparatus such as a copying machine and a facsimile machine, or another image forming apparatus such as a multifunction printer combining these functions may be used. In addition, the image forming apparatus has been exemplified in which an intermediate transfer member is used, toner images of each color are transferred onto the intermediate transfer member in a sequentially superimposed manner, and the toner images carried on the intermediate transfer member are collectively transferred to a recording material, but the present invention is not limited to this. The image forming apparatus may be an image forming apparatus that uses a recording material carrying member and transfers toner images of each color on the recording material carried on the recording material carrying member in a sequentially superimposed manner. Similar effect can be obtained by applying the present invention to the optical print head used in these image forming apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-186045, filed Nov. 6, 2020, which is hereby incorporated by reference herein in its entirety.

What is claimed is:

1. A method for manufacturing an optical print head including a lens array and a substrate cut out from a substrate assembly, the substrate assembly including a plurality of substrates,
    wherein the substrate includes:
        (i) a plurality of wiring pads mounted on a first surface of the substrate,
        (ii) a plurality of chips mounted on the first surface and aligned along a longitudinal direction of the substrate, each of which includes a plurality of light emitting elements configured to emit light and is connected to a different one of the plurality of wiring pads by a wire, and
        (iii) a plurality of electronic components mounted on a second surface of the substrate opposite to the first surface, including a driver IC (Integrated Circuit) that drives the plurality of light emitting elements,
    wherein the lens array includes a plurality of lenses each of which condenses light emitted from the plurality of light emitting elements, and
    wherein the plurality of the substrates in the substrate assembly are connected by a plurality of connecting portions,
    the method comprising:
    mounting the driver IC on the second surface of each substrate in the substrate assembly,
    mounting the plurality of light emitting elements on the first surface of each substrate in the substrate assembly,
    applying wire bonding to the plurality of wiring pads and the plurality of the chips of each substrate in a state in which both sides in a lateral direction of the second surface of each substrate in the substrate assembly on which the driver IC is mounted are supported by a jig along the longitudinal direction, and
    cutting the plurality of connecting portions,
    wherein the substrate includes a plurality of connecting pieces obtained by cutting a connecting portion with another substrate in the longitudinal direction of the substrate, and
    wherein at least one of the connecting pieces is provided at a position corresponding to a region of the substrate where the driver IC is to be mounted in the longitudinal direction of the substrate.

2. The method for manufacturing the optical print head according to claim 1, wherein
    in a region except for a region where the driver IC is mounted in the longitudinal direction, at least 1.5 mm from both ends in a lateral direction is defined as a region where the plurality of electronic components is not mounted, the lateral direction being orthogonal to the longitudinal direction and parallel to the first surface.

3. The method for manufacturing the optical print head according to claim 1, wherein at least one of the light emitting elements is provided at a same position in the longitudinal direction as the driver IC mounted on the second surface of the substrate.

4. The method for manufacturing the optical print head according to claim 1, wherein
the jig supports a region where the driver IC is not mounted in the longitudinal direction of the substrate.

5. The method for manufacturing the optical print head according to claim 1, wherein
the connecting piece at the position corresponding to the region of the substrate where the driver IC is to be mounted is obtained by cutting the connecting portion with a position corresponding to a region of another adjacent substrate where the driver IC is to be mounted.

* * * * *